May 21, 1935.    A. L. DILLER ET AL    2,002,391

METHOD OF MAKING ORNAMENTED RUBBER ARTICLES

Filed Feb. 27, 1934

Inventors
Alvin L. Diller
Leslie H. L'Hollier
By Eakin & Avery
Attys.

Patented May 21, 1935

2,002,391

UNITED STATES PATENT OFFICE 2,002,391

METHOD OF MAKING ORNAMENTED RUBBER ARTICLES

Alvin L. Diller, Belmont, and Leslie H. L'Hollier, Waltham, Mass., assignors to Hood Rubber Company, Inc., Watertown, Mass., a corporation of Delaware Application February 27, 1934, Serial No. 713,167

4 Claims. (Cl. 18—58)

This invention relates to the manufacture of ornamented rubber articles and especially to the production of rubber articles with both variegated and configured surfaces.

The chief objects of the invention are to provide an attractively ornamented article and to provide convenient procedure for producing the same. A more specific object is to utilize in special advantage the phenomenon of surface tension of liquids in the production of ornamentation.

These and further objects will be apparent from the following description, reference being had to the accompanying drawing in which.

Figure 1:
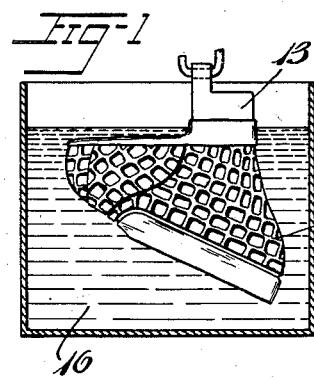
Fig. 1 is a vertical section of a dipping tank with a footwear form suspended therein and utilized in accordance with the preferred procedure of the invention.

In the preferred manner of carrying out the invention, the production of a rubber shoe being chosen for illustration, a form 10 is provided having an embossed surface such that it has miniature hills 11, 11 and valleys 12, 12 in the desired design, for example, that of a reptile skin. The form may be constructed by covering a rigid support 13 with a socklike structure 14 of sheet material, such as leather or rubber, having the desired embossed surface, the sock being closed at its open end by a binding tape 15. For the sake of economy of space, and to provide certain advantages hereinafter more fully discussed, the form may be of the flat shape shown, the dimensions of which, however, are such as to permit subsequent shaping of a layer of rubber molded upon it to the final shoe shape without objectionable stretching of such layer.

Figure 2:
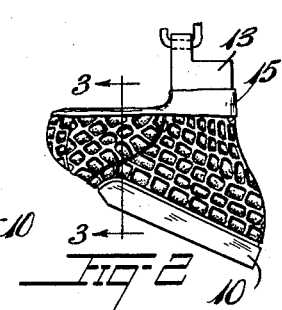
Fig. 2 is an elevation of the form of Fig. 1 having ornamenting material deposited thereon.

The form is coated with a liquid-dispersed ornamenting material of the desired color, as by dipping the form in a bath 16 of the same (Fig. 1) and then suspending the form as shown in Fig. 2 to permit the surplus of the dispersion to drain off and to permit the remaining dispersion to settle in an ornamenting arrangement. Prior to depositing the ornamenting dispersion, the form surface may be wetted with a liquid, as by dipping the form in water, to avoid the trapping of air next to the form surface.

Figure 3:
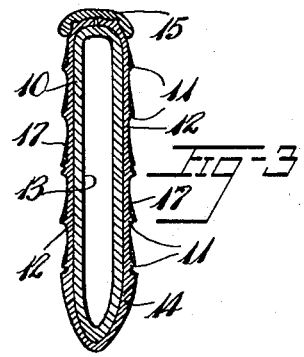
Fig. 3 is an enlarged section taken along the line 3—3 of Fig. 2.
Figure 5:
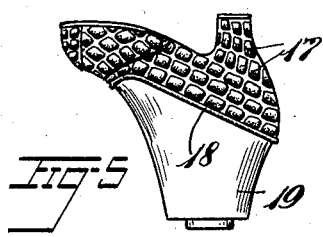
Fig. 5 is an elevation of a lasted, ornamented rubber shoe constructed according to and embodying the invention in its preferred form.
Figure 4:
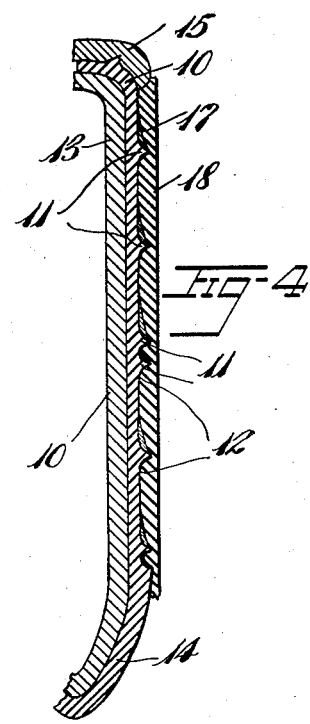
Fig. 4 is a still greater enlargement, with parts broken away, of the form and ornamenting material of Fig. 3 having a layer of rubber of the final article deposited upon the same.

The dispersion remaining on the form accommodates itself to the embossed surface thereof, under the influences of gravity and of the surface tension of the liquid, and if the dispersion is of such fluidity that gravity is not entirely overcome by surface tension, the dispersion in each valley will take the form of a sagging meniscus with the thickest portion of the deposit located at or near the lowermost portion of the valley, which, in the suspended position of the form will be at the lowermost hillside of each valley, and with a gradual diminishing thickness of the deposit upwardly toward the other side of the valley as shown at 17, 17 in Figs. 2, 3 and 4. According to whether the liquid of the dispersion is such as to wet the surface of the form easily or poorly, the film in some cases will be continuous over the crests of the hills, although very thin in those regions, or it may become separated at the hills and gather in small puddles in the valleys.

The deposited dispersion is then permitted to dry, at least partially, upon the form, and a layer 18 of rubber providing the body of the article and a backing for the deposits of a different color or shade than the deposits is molded against the form and deposits thereon, preferably by dipping the latter in an aqueous dispersion of the rubber with the aid of a coagulant to effect the deposition, and drying the deposit.

The layer of rubber 18 with the ornamenting deposits 17, 17 adhering thereto is then removed from the form and mounted inside out upon a shaping last 19 in association with such other shoe parts as may be desired, such as an insole, outsole, heel and lining, and the whole then vulcanized on the last.

In the surface of the final article the ornamenting deposits appear chiefly at the side portions of the ridges corresponding to the lower hillsides of the form, the remaining portions of the surface showing the color of the base layer 18 of the article. The effect of the ornamentation is to emphasize the configuration of the surface and, in the case of reproducing the surface of leather, to enhance the similarity of its appearance to real leather.

By the use of the flat form shown, rather than one with curved sides, a greater uniformity of distribution of the ornamenting material over each side surface is obtained, the draining being very nearly the same as to all of the depressions.

It is preferred to use an aqueous dispersion of rubber containing the desired coloring agent for the ornamenting material. Good results have been obtained with the use of latex diluted and pigmented so that the dispersion into which the form is dipped comprises about eight to fifteen percent by weight of solid matter, the rest being liquid. The proportion of solid matter is governed to some extent according to whether a deep or pale shade of the color is desired.

Figure 6:
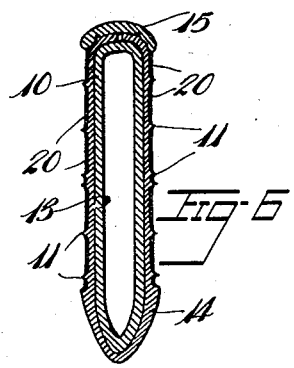
Figs. 6 and 7 are views similar to Figs. 3 and 4, respectively, but illustrating a modification in the manner of carrying out the invention, effective to produce a different ornamental effect.
Figure 7:
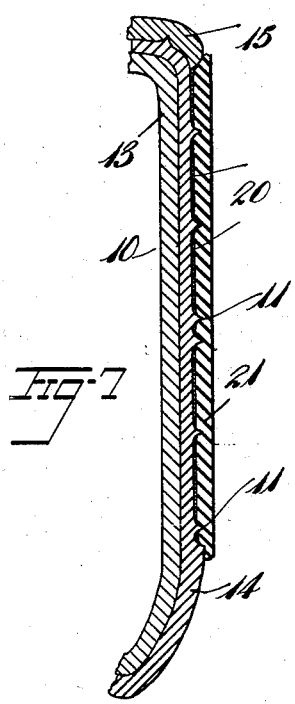
Figure 8:
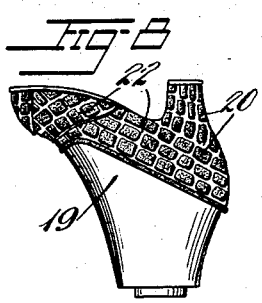
Fig. 8 is a view similar to Fig. 5 but showing a shoe with the modified ornamentation obtained in accordance with Figs. 6 and 7.

By materially decreasing the liquidity of the ornamenting dispersion a different effect may be produced as illustrated in the modification of Figs. 6, 7 and 8.

In this procedure the form is dipped and allowed to drain and dry as in the procedure described for Figs. 1 to 5, but a dispersion is used of such viscosity that it does not flow as readily and remains predominantly in the bottoms of the valleys in the surface of the form, as shown at 20, 20, the effect of surface tension on the liquid, however, being sufficient to cause the deposit to be exceedingly thin or broken at the hillsides and crests of the form.

After the layer of body rubber 21 has been deposited upon the form and stripped off, the ornamenting deposits appear upon it chiefly at the tops of the configuration, the depressions between, corresponding to the crests of the form, showing the color of the rubber 21, as shown at 22 in Fig. 8.

Good results for this manner of ornamentation have been obtained by the use of an ornamenting dispersion containing about one-half by weight of solid matter.

We claim:

1. The method of making an ornamented rubber article which comprises providing a negative form configured with miniature valleys and hillsides in its surface, depositing on said form an ornamenting dispersion of such fluidity and low content of coloring matter that, after draining and at least partially drying, the residue of the deposit appears in areas of relatively deep hue merging with areas of fainter hue, permitting the deposited dispersion thus to drain and dry, then depositing upon the form a layer of rubber and removing the latter to provide a positive of the surface configuration with the ornamenting deposits adhered to its surface and with its surface color appearing between the areas of deepest hue of the deposits.

2. A method as defined in claim 1 in which the form is so suspended during the draining and drying that the valleys are defined by upper and lower hillsides and the deposited ornamenting dispersion is of such fluidity that the lower one of the hillsides of each valley receives the deepest hue of the deposit.

3. A method as defined in claim 1 in which the deposited ornamenting material is of such small degree of fluidity that the bottom of each valley receives the deepest hue of the ornamenting deposit merging into a fainter hue at the hillsides of the valley.

4. A method as defined in claim 1 in which the form is of a generally flat shape and the ornamented rubber article formed upon it is subsequently shaped upon a support.

ALVIN L. DILLER.
LESLIE H. L'HOLLIER.